Nov. 28, 1967 B. H. PINCKAERS 3,355,594
SEMICONDUCTOR ELECTRONIC TIMING CIRCUIT UTILIZING MAGNETIC COUNT CORE
Filed June 15, 1964
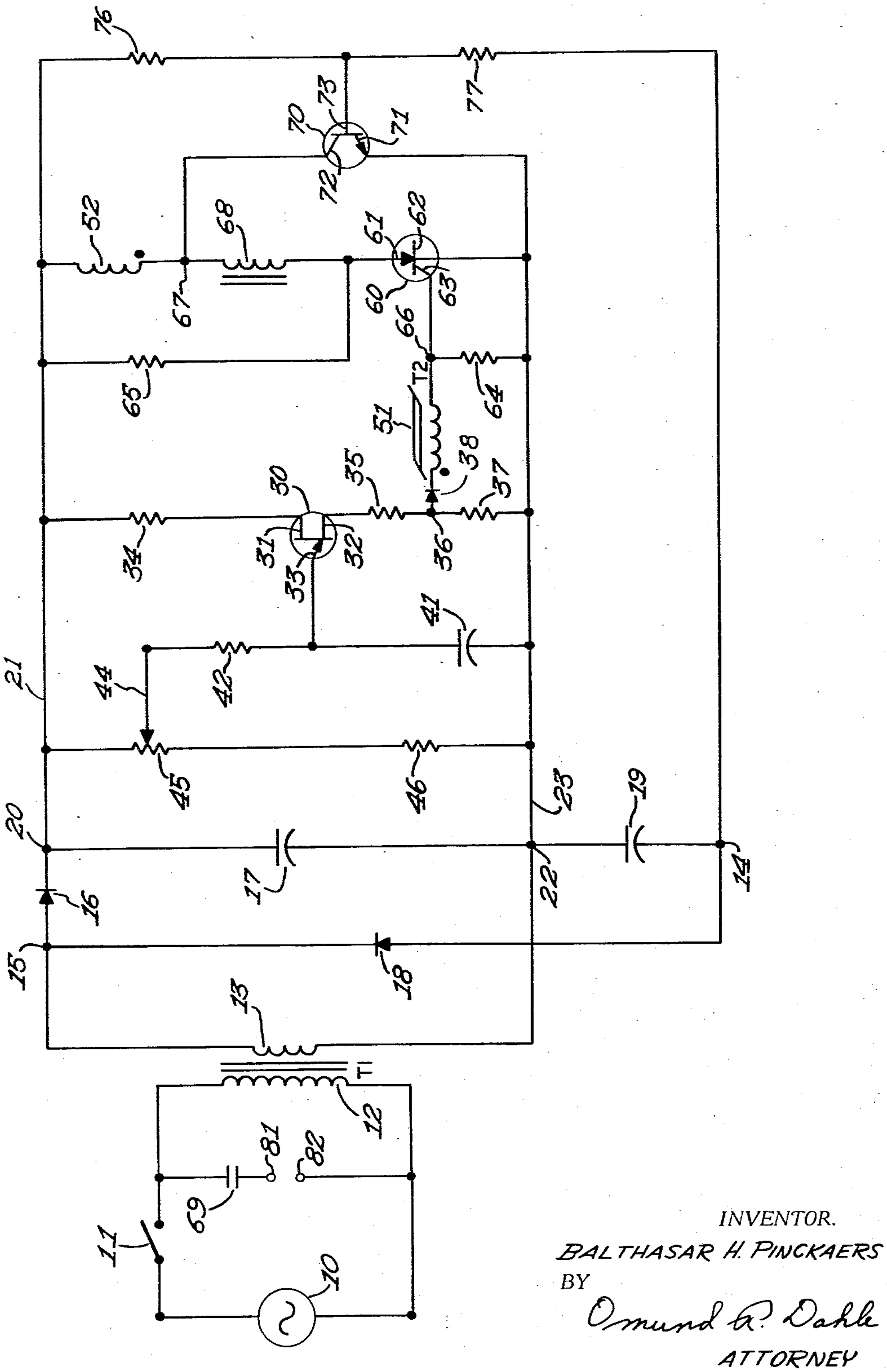
INVENTOR.
BALTHASAR H. PINCKAERS
BY
Omund R. Dahle
ATTORNEY 3,355,594
Patented Nov. 28, 1967

3,355,594

SEMICONDUCTOR ELECTRONIC TIMING CIRCUIT UTILIZING MAGNETIC COUNT CORE

Balthasar H. Pinckaers, Edina, Minn., assignor to Honeywell Inc., Minneapolis, Minn., a corporation of Delaware Filed June 15, 1964, Ser. No. 374,923
7 Claims. (Cl. 307—88)

This invention is concerned with control apparatus and more particularly with a semiconductor electronic timing circuit utilizing a unijunction transistor relaxation oscillator, a saturable magnetic count core, and a semiconductor controlled rectifier.

The applications of timers in the control field are many and varied. Any improvements which result in lower cost, greater accuracy, or decrease in physical size are always welcome in the art. Further, any new counting or timing circuits which are easily susceptible to automatic safety features, such as automatic reset features, are also desirable improvements in the art.

The invention of this application is a timer, such as a purge timer, which involves, briefly, the use of a unijunction transistor relaxation oscillator to drive a saturable magnetic count core which has a substantially rectangular hysteresis loop. The oscillator is the initial source of timing, which puts out a current pulse at predetermined periodic intervals. The output pulses from the oscillator are "counted" by the magnetic core, and when the core saturates the subsequent output pulse is allowed to pass to the turn-on gate of a semiconductor controlled rectifier. The controlled rectifier in turn allows current to flow through a control device, such as a relay coil, to bring power to a load. A feature of the timing circuit is a reset coil for the magnetic core which also receives a current to reset the core when the controlled rectifier is turned on. A further feature is the use of a transistor so biased that when power is applied to the timer the transistor will be off, but if power should be removed from the system the transistor will turn on to allow a charged capacitor to discharge through the reset coil to assure that the next time power is turned on, the magnetic count core will be starting from the reset position.

It is therefore an object of this invention to provide an improved and inexpensive relay control circuit.

It is another object of this invention to provide a semiconductor timing circuit with automatic reset means operative in the event of loss of power.

It is a further object of this invention to provide a timer circuit including magnetic counting means having automatic safety reset means.

These and other objects of this invention will become apparent upon consideration of the accompanying claims, specification and drawing, of which:

The single figure of the drawing is a schematic representation of a preferred embodiment of the timer apparatus of this invention including the improved reset feature.

With reference to the single figure, there is disclosed a source of bi-directional or AC potential 10 having one end connected to one end of a primary winding 12 on a transformer T1. A power switch 11 is connected intermediate the other end of a source 10 and the other end of winding 12. A secondary winding 13 on transformer T1 has one end connected to a terminal 15 and another end connected to a terminal 22. Terminal 15 is connected to the anode of a diode 16, which diode 16 has its cathode connected to a terminal 20. Terminal 15 is also connected to the cathode of a diode 18, which diode 18 has its anode connected to a terminal 14. Terminal 14, is connected to one end of a capacitor 19, the other end of capacitor 19 is connected to terminal 22. A capacitor 17 is connected intermediate terminals 20 and 22.

There is also disclosed a unijunction transistor 30 having a first base 31, a second base 32, and an emitter 33. Base 31 is connected through a resistor 34 to a power lead 21 connected to terminal 20. Base 32 is connected through a resistor 35 to a terminal 36. A resistor 37 is connected between terminal 36 and a power lead 23 which is connected to terminal 22. Emitter 33 of unijunction transistor 30 is connected through a capacitor 41 to lead 23. Emitter 33 is also connected through a resistor 42 to an arm 44 of a potentiometer 45. Potentiometer 45 has one end connected to lead 21 and another end connected through a resistor 46 to lead 23. It will be apparent that the unijunction transistor and the surrounding components with which it is connected comprise a well known unijunction transistor relaxation oscillator, capable of providing a positive output pulse at terminal 36. Varying the setting of potentiometer 45 will vary the period between output pulses. A set coil or count coil 51, wound around a saturable magnetic core T2, is connected, in series with a diode 38, intermediate terminal 36 and a terminal 66. Terminal 66 is connected through a resistor 64 to lead 23. Saturable magnetic core T2 is of the type having a plurality of stable states, of which the first and last stable states are represented by the saturated limits of a substantially rectangular hysteresis loop.

There is also shown a semiconductor controlled rectifier 60 having an anode 61, a cathode 62, and a gate electrode 63. Gate electrode 63 is connected to terminal 66. Cathode 62 is connected to lead 23. Anode 61 is connected to one end of a relay coil 68. The other end of relay coil 68 is connected to a terminal 67. Terminal 67 is connected through a reset winding 52 on a magnetic core T2 to lead 21. Anode 61 is also connected through a resistor 65 to lead 21. Also disclosed is a semiconductor switching device, here shown as a transistor 70 having an input electrode or emitter electrode 71, an output electrode or collector electrode 72 and a control electrode or base electrode 73. Collector electrode 72 is connected to terminal 67. Emitter electrode 71 is connected to lead 23. Base electrode 73 is connected through a resistor 75 to lead 21. Base electrode 73 is also connected through a resistor 77 to terminal 14. A normally open relay contact 69, associated with relay coil 68, is connected through switch 11 to one end of a source 10 and is also connected to a load terminal 81. Another load terminal 82 is connected to the other end of source 10.

The operation of the schematic of the single figure will now be described in particular. When switch 11 is closed the AC source of potential 10 will be felt across primary winding 12 of transformer T1, thus causing an alternating voltage to appear across secondary winding 13 of transformer T1. Diode 16 and capacitor 17 are serially connected across secondary winding 13 to form a half-wave rectifier and filter combination. Diode 18 and capacitor 19 are also connected serially across secondary winding 13 to form a second half-wave rectifier and filter combination. The rectifiers are arranged such that they will charge their respective capacitors on alternate half cycles. In the embodiment shown in the single figure, capacitors 17 and 19 will charge to substantially equal voltages.

The circuit comprising diode 16 and capacitor 17 will act as a source of DC potential for the unijunction tronsistor relaxation oscillator comprising unijunction transistor 30 and its associated resistors and capacitor. The operation of such a relaxation oscillator is well known in the art but will be described here briefly. A current will flow from capacitor 17 through terminal 20, lead 21, terminal 22, and back to capacitor 17. It will be noted that this current flow will charge capacitor 41. When the charge on capacitor 41 reaches a level predetermined by bias resistors 34, 35 and 37, the uniqunction transistor 30 will turn on to allow the capacitor 41 to discharge. The discharge current will flow from capacitor 41, through emitter 33 to base 32 of unijunction transistor 30, through resistors 35 and 37, and through lead 23 back to the other side of capacitor 41.

It will be obvious that the discharge of capacitor 41 will cause a positive output pulse at junction 36. This output pulse will cause a current flow through diode 38 and count winding 51 of magnetic count core T2. Each output pulse will move count core T2 from one of its plurality of stable states to another, until the last or saturation state is reached. When count core T2 is driven into saturation a sharp drop in the impedance of count coil 51 occurs. Thus, subsequent output pulses from the relaxation oscillator will be nearly completely felt on the gate electrode 63 of semiconductor controlled rectifier 60.

The positive bias on gate electrode 63 will cause SCR 60 to turn on. The turn on of SCR 60 will allow a current flow from capacitor 17 through lead 21, reset coil 52, relay coil 68, from anode 61 to cathode 62 of SCR 60, and back through lead 23 to capacitor 17. This current flow will perform two functions. First, by passing through reset coil 52 it will reset magnetic count core T2 to its initial state of saturation. Second, by passing through relay coil 68 it will cause normally open relay contact 69 to close and thus actuate load terminals 81 and 82. A resistor 65 has been connected in parallel with coils 52 and 68 to provide a starting current for SCR 60, at the time when the impedance of the coils is high. When current has been flowing for a short time, impedance of the coils will drop and the resistance of resistor 65 becomes quite high in comparison.

The timing circuit may be seen to be fail safe with respect to capacitor 41 in the unijunction transistor relaxation oscillator. Should the capacitor 41 short, it will be obvious that the unijunction transistor 30 will not be able to fire, thus there will be no pulse to the count coil 51, and the circuit will never be turned on. If the capacitance of capacitor 41 should degradate, the output pulse to the count coil 51 would become too small to drive the core T2 into saturation. As the capacitor 41 degradates, the period between output pulses from the relaxation oscillator will shorten, but the decreased charge on the capacitor 41 would result in a shorter pulse to the count coil 51, and thus the volt-time integral available to saturate the core T2 would remain substantially the same and thus the time delay would not be affected.

There is also provided a safety reset feature comprising a semiconductor switch here shown as transistor 70. The purpose of the switch is to provide a reset current for reset coil 52 in the event of a power shutdown prior to the end of the desired count. The operation may be described as follows.

The substantially equal voltages on capacitors 19 and 17, as associated with resistors 76 and 77, will cause a bias voltage on base 73 of transistor 70 such as to hold transistor 70 off during normal operation. Capacitor 19 is chosen such that if power to the pair of half-wave rectifiers should be removed, capacitor 19 would discharge at a faster rate than would capacitor 17. This in turn would cause a change in the bias voltage on base 73 of a polarity to turn on transistor 70. When transistor 70 turns on it can be seen that capacitor 17 will then discharge through lead 21, reset coil 52, from collector 72 to emitter 71 of transistor 70, and back through lead 23 to the other side of capacitor 17. Thus, the discharge of capacitor 17 will cause a reset current through reset coil 52 to return magnetic count core back to its initial state of saturation, so that should power be applied at some future time the counter will not start from an advanced state.

It should be noted that capacitors 17 and 19 need not be charged to substantially equal voltages, as in the preferred embodiment shown, as long as the voltage divider comprising resistors 76 and 77 are selected such that the bias on base electrode 73 will hold transistor 70 off during normal operation. It should also be noted that other types of semiconductor switching devices may be used in place of SCR 60 and transistor 70 shown in the preferred embodiment.

It will be obvious that the general principles herein disclosed may be embodied in many other forms other than that specifically illustrated without departing from the spirit of the invention as defined in the following claims.

What is claimed is:

1. A control circuit comprising:
a source of bi-directional potential;
half-wave rectifier means including energy storage means;
means connecting said rectifier means across said source of potential;
oscillator means having an input and an output circuit;
means connecting said input circuit across said energy storage means;
a counter having input and output terminals, said counter including counter reset means;
means connecting said output circuit to said input terminal;
a semiconductor switching device having input, output, and control electrodes;
means connecting said output terminal to said control electrode;
control means; and
means connecting said counter reset means, said control means, said input electrode, and said output electrode serially across said energy storage means.

2. A control circuit comprising:
a source of bi-directional potential;
first and second half-wave rectifier means including, respectively, first and second energy storage means;
means connecting each of said first and second rectifier means across said source of potential;
oscillator means having input and output circuits;
means connecting said input circuit across said first energy storage means;
a counter having input and output terminals, said counter including counter reset means;
means connecting said output circuit to said input terminal;
a first semiconductor switching device having input, output, and control electrodes;
means connecting said output terminal to said control electrode;
control means;
means connecting said counter reset means, said control means, said input electrode, and said output electrode serially across said first energy storage means;
a second semiconductor switching device having, second input, output, and control electrodes;
means connecting said counter reset means, said second input electrode, and said second output electrode serially across said first energy storage means;
means connecting said first energy storage means to said second control electrode; and
means connecting said second energy storage means to said second control electrode.

3. A timing circuit comprising:
a source of potential;
a relaxation oscillator having an output terminal, said oscillator connected across said source of potential;
a saturable magnetic count core having a plurality of stable states wherein the first and last of said plurality of stable states are the saturated limits of a substantially rectangular hysteresis loop;

a set coil, and a reset coil wound on said magnetic count core;

semiconductor switching means including input, output and control electrodes;

means connecting said set coil intermediate said output terminal and said control electrode;

control means including a control coil; and means connecting said control coil, said reset coil, said input electrode and said output electrode serially across said source of potential.

4. Automatically resettable timing apparatus comprising:

a source of AC potential;

first and second rectifier circuits including, respectively, first and second capacitors, said rectifier circuits being coupled to said source of AC potential to provide first and second sources of DC potential;

relaxation oscillator means connected across said first capacitor;

a semiconductor controlled rectifier including anode, cathode and gate electrodes;

a saturable magnetic count core having a plurality of stable states wherein the first and last of said plurality of stable states are the saturated limits of a substantially rectangular hysteresis loop, said count core having wound thereon a count coil and a reset coil;

means connecting said count coil intermediate said relaxation oscillator and said gate electrode;

a control relay including a control coil;

means connecting one polarity of said first capacitor to one end of said reset coil, means connecting said control coil intermediate the other end of said reset coil and said anode electrode, and means connecting said cathode electrode to another polarity of said first capacitor;

semiconductor switching means including input, output and control electrodes;

means connecting said output electrode to said other end of said reset coil and means connecting said input electrode to said cathode electrode;

means connecting a first polarity of said second capacitor to said another polarity of said first capacitor;

means connecting said one polarity of said first capacitor to said control electrode; and means connecting a second polarity of said second capacitor to said control electrode.

5. In combination with timing apparatus including a saturable magnetic count core, an automatic reset circuit comprising:

a semiconductor switch having input, output and control electrodes;

first and second capacitors;

energy means for charging said first and second capacitors;

a reset coil for resetting said count core;

means connecting said reset coil intermediate a first polarity of said first capacitor and said output electrode;

means connecting a second polarity of said first capacitor to said input electrode and to a first polarity of said second capacitor; and means connecting said control electrode to said first polarity of said first capacitor and a second polarity of said second capacitor, so that if said energy means stops charging said capacitors, said capacitors will discharge at a different rate to thus provide a bias to said control electrode to turn on said semiconductor switch and allow a current to flow through said reset coil.

6. Timing apparatus comprising:

a source of potential;

a unijunction transistor relaxation oscillator connected across said source of potential, for periodically forming a pulse output;

a saturable magnetic count core having a plurality of stable states wherein the first and last of said plurality of stable states are the saturated limits of a substantially rectangular hysteresis loop, and whereon are wound a count coil and a reset coil;

means connecting said count coil to said oscillator to receive said pulse output, so that each pulse output will drive said count core from one to another of said plurality of stable states;

a semiconductor controlled rectifier having an anode, a cathode and a gate electrode;

means connecting said reset coil, said anode electrode and said cathode electrode serially across said source of potential; and means connecting said count coil to said gate electrode, so that when said count core is driven into said last stable state, the resulting decrease in impedance of said count coil will allow the next of said pulse outputs from said oscillator to turn on said controlled rectifier, thus allowing a current to flow through said reset coil to drive said count core back to said first stable state.

7. The apparatus as described in claim 6 including automatic reset means comprising:

a semiconductor switching device having input, output and control electrodes;

first and second capacitors;

means connecting said first capacitor and said reset coil serially between said output electrode and said control electrode;

means connecting said second capacitor between said input electrode and said control electrode; and means connecting said first and second capacitors to said source of potential so that each of said capacitors will charge to a voltage to thus bias off said switching device, and so that when said source of potential is removed said capacitors will discharge at a different rate to thus bias on said switching device to allow said first capacitor to discharge through said reset coil to reset said count core.

References Cited

UNITED STATES PATENTS

| | | | |
|---|---|---|---|
| 2,838,669 | 6/1958 | Horsch | 250—27 |
| 3,109,936 | 11/1963 | Rennie | 307—88 |

BERNARD KONICK, *Primary Examiner.*

S. URYNOWICZ, *Assistant Examiner.*